United States Patent [19]
Lambert, Jr.

[11] 3,908,840
[45] Sept. 30, 1975

[54] DEPENDING-AUGER AND SURROUNDING-SLEEVE SILAGE HOLE-FORMER

[75] Inventor: Charles F. Lambert, Jr., Louisville, Ky.

[73] Assignee: Clayton & Lambert Manufacturing Company, Buckner, Ky.

[22] Filed: Dec. 17, 1973

[21] Appl. No.: 425,308

[52] U.S. Cl............................. 214/17 DB; 175/323
[51] Int. Cl.²........................................ B65G 65/38
[58] Field of Search............ 214/17 R, 17 CB, 17 D, 214/17 DB; 175/323, 394

[56] References Cited
UNITED STATES PATENTS

| 601,124 | 3/1898 | Cole............................. 175/323 X |
| 2,864,601 | 12/1958 | McCarthy et al............... 175/323 X |
| 2,941,677 | 6/1960 | Korber.......................... 214/17 DB |
| 3,297,177 | 1/1967 | Zeiter........................... 214/17 DB |

*Primary Examiner*—Robert G. Sheridan
*Attorney, Agent, or Firm*—Arthur F. Robert

[57] ABSTRACT

This hole-former broadly comprises: a unit composed of a rotatable auger vertically-depending from a motorized shaft mounted on a horizontal rotary sweep and surrounded by a close-fitting sleeve mounted on the sweep. In one embodiment, the auger projects from both ends of the sleeve. When a sweep with this one embodiment is raised during a silo filling operation, the sleeve and auger function as a cylindrical hole-forming barrier, the sleeve functions as an auger wobble-restricting guide, while the auger functions to prevent any appreciable leakage of incoming silage downwardly through the sleeve.

When the sweep and this one embodiment are lowered during a silo unloading operation, the upper end portion of the projecting auger functions to prevent the unloading silage from bridging across the upper end of the discharge hole, the sleeve-surrounded portion of the auger functions to promote the flow of silage downwardly through the sleeve and the lower projecting end of the auger functions to ream the discharge hole, which usually narrows as a result of some factor such as the weight of the silage above it, and, by reaming the hole, correspondingly prevents the sleeve from jamming in a narrowed portion of the hole.

In another embodiment, the auger projects only from the lower end of the sleeve. This embodiment preserves all functions of the sleeve and auger during filling and unloading except that it may lessen the restriction on bridging during unloading.

12 Claims, 6 Drawing Figures

U.S. Patent  Sept. 30, 1975  3,908,840

DEPENDING-AUGER AND SURROUNDING-SLEEVE SILAGE HOLE-FORMER

CROSS REFERENCE TO RELATED APPLICATION

My copending application SN-416,680 filed Nov. 16, 1973 discloses a rotatable depending-auger hole-former, which is sleeveless or fully exposed. My copending application SN-464,124 filed Apr. 25, 1974 discloses another depending-auger/surrounding-sleeve silage hole-former as its preferred embodiment.

BACKGROUND OF THE INVENTION

1. Field of the Invention

This invention relates to silage hole-formers which are used in cylindrical feed-storage tanks or silos on horizontally rotary sweeps of the spreading/unloading type to form a discharge hole extending vertically through a column of silage in the silo. More particularly, the invention relates to an improvement in the silage hole-forming subject matter of my aforesaid copending application.

2. Description of the Prior Art

Horizontal rotary sweeps of the spreading/unloading type equipped with depending hole-formers are commonly used in feed-storage tanks, wherein they function: during a tank filling or loading operation, to spread incoming silage more or less uniformly throughout the cross-sectional area of the tank and contemporaneously form a vertical silage-discharge hole extending centrally through the rising column of silage; and, during a tank unloading operation, to remove silage from the top of the stored column and direct it inwardly toward and downwardly into said discharge hole. In some cases, the inwardly flowing silage bridges across the mouth of the discharge hole, which is objectionable.

The U.S. Pat. to Hazen No. 3,075,657 granted Jan. 29, 1963 discloses a horizontal rotary sweep mounted on a ring gear in a silo for tracking rotation about the vertical axis of the gear and provided with a center hole-former in the form of a closed vertical cylinder depending 2' to 5' from the sweep frame along the common centrally-disposed vertical axes of the ring gear and the sweep unit. This hole-former must be manually removed from the hole before the unloading operation can be instituted.

The U.S. Zeiter Pat. No. 3,297,177 granted Jan. 10, 1967 discloses a rotary sweep provided with a center hole-former in the form of a bottom-vertical cylinder, the upper end of which is lid-closed for the filling operation and lid-opened for the unloading operation. Zeiter's hole-former eliminates the necessity of effecting the manual removal of the hole-former before the unloading operation can be instituted. Closable hole-formers sometimes jam in the hole during unloading due to the substantial narrowing of the hole as a result of the weight of the silage above the point where the jamming occurs.

My aforesaid copending application SN-416,680 filed Nov. 16, 1973 discloses a silage hole-former in the form of a rotatable depending auger which is sleeveless. While this fully exposed auger hole-former may be satisfactorily used in connection with the loading and unloading of both fibrous and particulate silage, its use in connection with fibrous silage is much more satisfactory than it is with particulate silage.

SUMMARY OF THE INVENTION

Objects of the Invention

The principal object of this invention is to provide an improved hole-former, which is highly and more or less equally satisfactory when used on fibrous and particulate silages.

Statement of the Invention

The principal object of my invention is achieved by providing the depending auger with a surrounding concentric sleeve. In one embodiment, the auger projects from both ends of the sleeve. During filling, the sleeve of said one embodiment functions as follows: 1st, in cooperation with the projecting end of said auger, as a cylindrical barrier which prevents the incoming silage from lodging within the cylindrical space of the barrier so that said silage builds up a column around said barrier and thus forms a vertical axially-open-ended silage-discharge hole rising upwardly from the bottom of the rising column of silage as the rotary sweep spreads the incoming silage over the top of the column; and 2nd, as a guide restricting any appreciable tendency of the auger to wobble about a given vertical axis in the silo. At the same time, the auger functions to prevent the substantial leakage of incoming silage downwardly through the sleeve. During unloading, the auger functions as follows: 1st, to prevent the outgoing stream of silage from bridging over the mouth of the discharge hole; 2nd, to promote the downward flow of the discharging silage through the sleeve; and 3rd, to ream reduced portions of the discharge hole which it may encounter during its downward travel. In another embodiment, the auger projects only from the lower end of the sleeve. During filling and unloading, the sleeve and auger of said other embodiment function the same as they do in said one embodiment except that, during filling, the upper end of the auger does not participate in the hole-forming function while, during unloading, the ability of the auger to restrict bridging may be lessened depending upon the position within the sleeve of the upper end of the auger.

BRIEF DESCRIPTION OF THE DRAWINGS

The invention is illustrated in the accompanying drawings wherein.

DESCRIPTION OF THE PREFERRED EMBODIMENT

Conventional Structure

Figure 1:
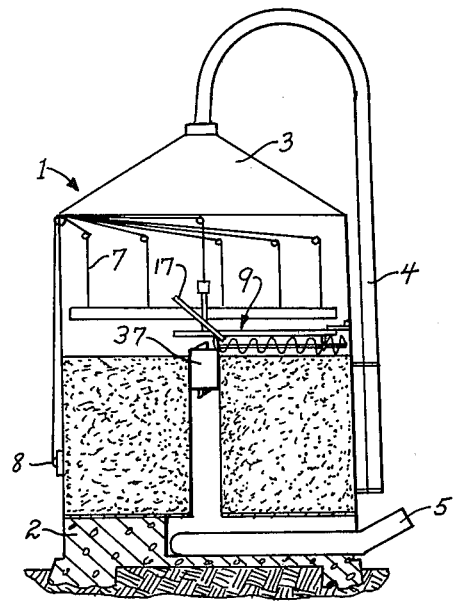
FIG. 1 is a somewhat schematic vertical section through a cylindrical feed storage tank or silo, which contains a column of silage and one embodiment of a horizontal rotary sweep equipped with an embodiment of my invention, this view omitting the auger drive means.
Figure 4:
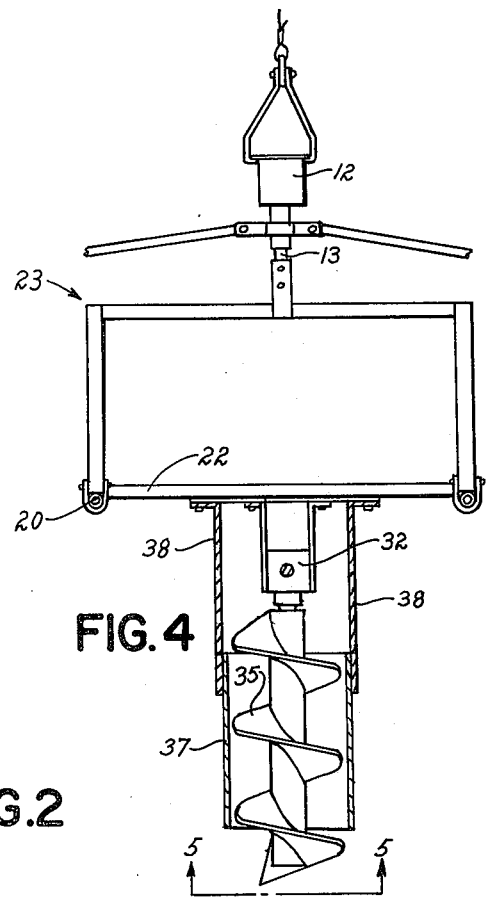
FIG. 4 is a partly broken elevational view taken at a right angle to FIG. 3 to show said one embodiment of my hole-former and its support.
Figure 2:
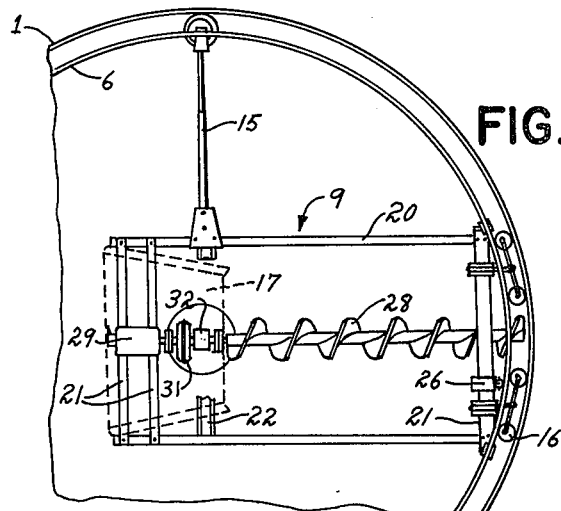
FIG. 2 is a horizontal section fragmentarily showing both the outer wall of the tank and the corresponding portion of the ring gear and also somewhat schematically showing a horizontal rotary sweep in top plan, this view showing a diverter board in dotted lines.
Figure 5:
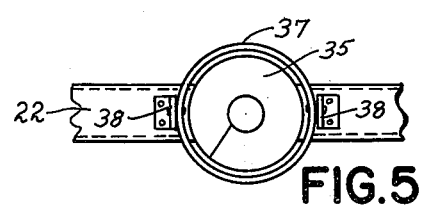
FIG. 5 is a bottom view of the hole-former, this view corresponding to the one taken along line 5—5 of FIG. 4.
Figure 3:
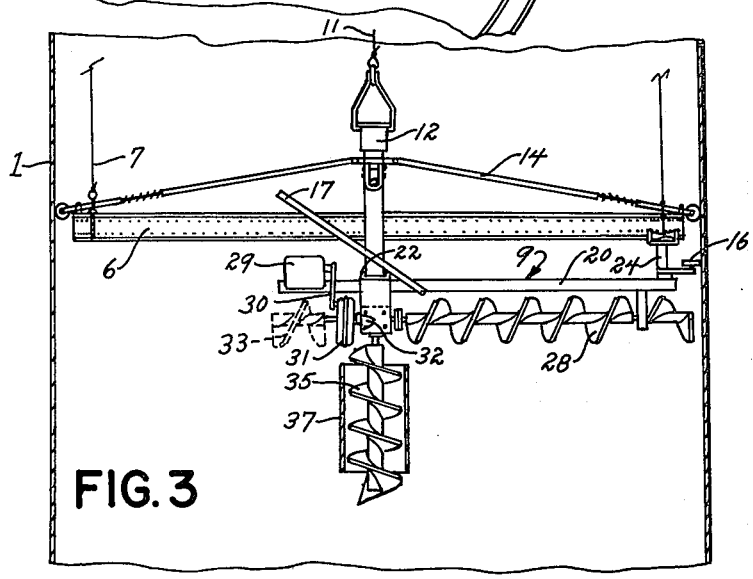
FIG. 3 is a vertical section showing the cylindrical wall of the tank, the annular ring gear, a rotary sweep in side elevation and one embodiment of my hole-former partly in section and partly in elevation.
Figure 6:
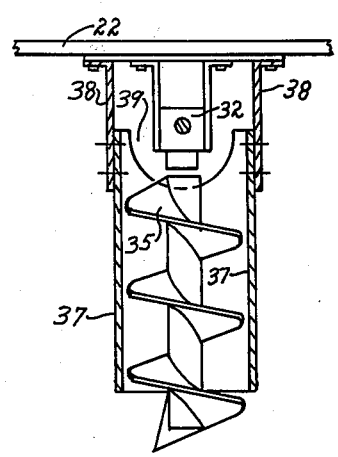
FIG. 6 shows another embodiment of my hole-former partly in section and partly in elevation and corresponds somewhat to the showing of said one embodiment in FIG. 4.

FIGS. 1–3 somewhat schematically illustrate: a tank; a circular ring gear; a conventionally constructed rotary sweep unit in which my invention is incorporated; and other conventional structure. The cylindrical feed-storage tank or silo 1 has a base 2, a top 3, a silage inlet pipe 4 which directs silage downwardly through the top of the tank 1 and a discharge conveyor 5 in the base 2. The circular ring gear 6 is supported within the tank by vertically-movable cables 7, which are connected to an outside winch 8 for gear raising and lowering purposes. The rotary sweep 9 has its outer end mounted on the ring gear 6 for vertical movement with the ring gear and for 1/5th to 1/10th rpm motorized tracking rotation about the ring gear's vertical central axis, which more or less coincides with the vertical center of the tank 1.

The conventional structure illustrated also includes: a centrally-disposed vertically-movable main suspension cable 11, which is also connected to winch 8; an electrical collector ring assembly composed of an outer stationary part 12 supported by cable 11 and an inner rotary part 13 depending from within and supported by the outer part 12; a pair of stationary wall-engaging radius torque-arms 14 extending radially from and supported on the outer part 12 and connected to ring gear 6; a wall-engaging centering arm 15 extending radially from and supported on the frame of the rotary sweep for movement therewith; a series of frame-mounted wall-engaging bumper wheels 16; and a frame-mounted diverter board 17 mounted on the rotary sweep frame in position to intercept the incoming silage and direct it onto the conveyor of the rotary sweep 9.

The (cable-and-ring-gear mounted) rotary sweep 9 may be of any conventional character comprising: a horizontal frame and a frame-mounted motorized silage-moving conveyor both of diametric, radius or intermediate extent. The specific sweep 9 illustrated, conventionally includes: a horizontal sweep frame of intermediate length motorized for tracking rotation about the axis of the ring gear; and a horizontally-extending sweep-frame-mounted silage-moving radius conveyor reversibly motorized for spreading and unloading purposes.

The horizontal sweep frame conventionally comprises: laterally spaced longitudinally extending radial frame members 20 integrated along the length of the frame by transverse frame members 21 and a transverse upwardly-open channel member 22 extending horizontally through the rotary axis of the sweep from the top side of one long frame member 20 to the other frame member 20 and rigidly secured to both. The inner end portion of the sweep frame is supported at the rotational axis of the sweep by an inverted U-shaped transverse frame member 23, which depends from the inner rotary part 13 of the collector ring assembly, and which is composed of a transversely-extending member in the form of a cross pipe and a pair of straps depending from opposite end portions of said cross pipe with their lower ends secured to both the long frame members 20 of the sweep frame and the opposite end portions of cross channel 22. The outer end of the sweep frame is supported from the ring gear 6 by vertical support members 24 depending from wheels, which are rotationally carried by the bottom flanges of the ring gear 6. The frame carries a tracking gear in tracking engagement with the ring gear 6 and a motor 26 for driving the tracking gear to effect the tracking rotation of the sweep about the vertical axis of the ring gear 6.

While the silage-moving horizontal radius conveyor may be of any suitable character, as illustrated, it is in the form of a single radius auger 28 conventionally mounted at is inner and outer ends on rigid supports which depend from the sweep frame. The horizontal auger 28 is driven from sweep-frame-mounted reversible drive motor 29 through belt 30, reduction gear 31 and gear box 32, which is suspended from cross channel 22 through intervening straps.

With the horizontal conveying auger 28 terminating at one side of the center discharge hole hereinafter described, I prefer to provide a one flight tail auger 33 located on the other side of said discharge hole and axially aligned with auger 28, which terminates adjacent said discharge hole. The tail auger 33 is not essential but its use may be desirable in some cases.

COMMON STRUCTURE

My aforesaid copending application 416,680 discloses an improved hole-former for use on a horizontal rotary sweep which has a vertical axis of sweep rotation and a motorized drive shaft depending on the underside of the sweep for rotation relative to the sweep about the vertical sweep axis thereof. Such hole-former comprises: a rotatable vertically-depending auger having a longitudinal center axis corresponding to said vertical axis of sweep rotation about which it may be rotated; and means for mounting that depending auger on the sweep for rising and lowering movement therewith, the mounting means connecting the upper end of the depending auger to the lower end of said depending drive shaft for rotation therewith.

The present application discloses an identical arrangement comprising an auger 35 which is rigidly connected to depend rotatably from the gear box 32 of the sweep and to be driven from the drive chain of horizontal auger 28. That drive chain comprises sweep-frame-mounted reversible drive motor 29, belt 30, reduction gear 31 and gear box 32. The length, pitch, diameter and rotational forward spreading and reverse unloading speeds of augers 28 and 35, and the mode of operation of the apparatus may be as stated in my aforesaid copending application.

INVENTIVE STRUCTURE

In accordance with my invention, a closely fitting open-ended cylinder or sleeve is placed around the depneding auger 35. In one embodiment, the auger projects from both ends of the sleeve. In the other embodiment, the auger projects only from the lower end of the sleeve.

1st Embodiment — Hole-Forming Sleeve and Auger

In this embodiment, a guide sleeve 37 having a pair of rigid diametrically opposite metal hanging straps 38, is arranged to extend concentrically around a substantial intermediate portion of the length of a vertical depending auger 35. The guide sleeve 37 is firmly supported in such position by rigidly mounting said hanging straps 38 on the underside of the bight of cross channel 22 of sweep frame 19. It may be helpful to note that the guide sleeve rotates with the rotary sweep.

The guide sleeve 37 may be of any suitable length. Lengths appreciably less than 12 inches or more than 33 inches may be usable but are not recommended. With an auger 35, which is 16 inches in both diameter and pitch, the guide sleeve 37 preferably should have a bore not appreciably greater than 16½ inches to provide a tolerance of about ¼th of an inch between the vertical auger and the guide sleeve. In filling a silo with corn stalk silage, I obtained good results using a 16 inch long cylindrical guide sleeve 37 having a 16½ inch bore enclosing the lower end portion of a 32 inch long vertical auger 35 down to a level about 2 to 4 inches above the lower end of that auger. The diameter and pitch of the depending auger 35 were also 16 inches. The auger speeds were 150 rpm although the depending auger 35 should be faster say 200 rpm. In this embodiment, the guide sleeve and the projecting portions of the auger function as a cylindrical barrier which prevents the incoming silage from lodging within the cylindrical space of such barrier. As a consequence, the silage surrounding the barrier builds up a silage column around the barrier and the barrier thus forms a vertical axially-open-ended silage-discharge hole rising upwardly from the bottom of the rising column of silage as the rotary sweep spreads the incoming silage over the top of that column.

The guide sleeve and auger effect a substantial reduction in auger wobble and sleeve leakage. These results appeared to be unchanged when the 16 inch guide sleeve 37 was lengthened to about 28 inches and arranged to cover a substantial portion (say 28 inches) of the entire 32 inch length of the auger 35. With opposite ends of the auger 35 projecting at least about 2 inches beyond opposite ends of the guide sleeve 37, good guiding, hole-forming and leakage-restricting results can be expected during filling. During unloading, good results will normally be achieved in flowing silage through the upper end of the discharge hole and in progressively reaming that hole, which normally prevents the lower end of the sleeve from jamming against the silage. The top edge of the sleeve should be spaced sufficiently below the top level of the silage to prevent the adjacent projecting portion of the auger 35 from wedging a thickness of corn stalk, for example, against the upper edge of the sleeve.

2nd Embodiment — Hole-Forming Sleeve and Auger

In this embodiment, the upper end edge of the sleeve 37 is raised to or above a level beyond which the depending auger 35 does not significantly project which is to say it does not project sufficiently to participate in the hole-forming function. In this embodiment, if the straps 38 are to be bolted or otherwise secured to the sleeve so as to provide bolt head, nut or other raised portions on the inside of the sleeve, then the sleeve should be extended to place these obstructions upwardly beyond the reach of the auger. In this embodiment, the extended sleeve is provided with a side inlet recess, serration or opening 39 to facilitate the horizontal flow of unloading silage inwardly into the sleeve.

The 2nd embodiment transfers all of the hole-forming function of the upper end of the auger in the 1st embodiment to the hole-forming sleeve but otherwise preserves all other functions of the auger and the sleeve. Both work equally well on fibrous silage and on particulate silage. The 2nd embodiment is preferred over the 1st only when mechanical strap-connecting obstructions are placed on the bore wall of the sleeve. Otherwise, I do not presently know of any reason for preferring either embodiment over the other.

While it is most convenient to mount auger 35 on the sweep and rotate it from a drive carried by the sweep, it will be appreciated that the mounting and drive of the auger 35 may be independent of the sweep and that the use of the hole-forming sleeve and auger is not restricted to the forming of a center discharge hole because it may be formed elsewhere, say along the silo sidewall. Also it is not restricted to the forming of that hole during the filling operation because it may be formed between filling and unloading operations.

It will be appreciated that I have produced an improved hole-former for use in a storage feed tank or silo comprising: a rotatable vertically-depending auger 35 having a longitudinal center axis about which it may be rotated; an open-ended close-fitting sleeve 37 surrounding the auger; and means for mounting the sleeve 28 and auger for vertical movement as a unit. When raised during or after a silo filling operation, the unit forms a vertical silage discharge hole therein. When raised during filling, which is preferred, the auger 35 preferably is rotated in a direction tending to move silage upwardly so that it will repel any incoming silage tending to pass downwardly through the sleeve. However, the auger 35 need not rotate in which event it functions as a stationary plug in the sleeve. This is not preferred since it requires the depending auger to be disconnected from the drive.

When the unit is lowered during a silo unloading operation, the sweep and conveying auger are reversed so as to feed inwardly. The depending auger also rotates in the opposite direction so as to promote the flow of silage downwardly through the sleeve. The depending auger functions to keep the discharge hole properly open because its upper end prevents unloading silage from bridging across the top of the discharge opening, its intermediate portion promotes the flow of that silage downwardly through the sleeve while its lower end reams the adjacent portion of the discharge hole to promote the flow of silage in that portion of the hole and contemporaneously prevent the sleeve from jamming against reduced bore portions of the hole.

In the 2nd embodiment, the auger may be eliminated and the open-ended sleeve used alone as a hole-former during the filling operation either: when the flow of some of incoming silage downwardly into and through the hole can be tolerated or when more elaborate care is used to reduce, if not eliminate, such flow. Thus, a more elaborate diverter board may be used to effect the desired reduction in the flow of incoming silage to the discharge hole during filling. While the use of the side opening 39 is greatly to be preferred in an augerless 2nd embodiment, it is not absolutely essential. In this connection, it may be noted: that, so far as I know, open-ended lid-less sleeves have not heretofore been used for hole-forming purposes during silo filling operations.

With an open-ended sleeve 37 having a side opening 39 and with a single reversible conveying auger 28 on a reversible rotary sweep 9, the inward flow of silage, during the unloading operation, will be on the advancing side of the horizontal auger 28; hence, the side opening 39 should not be centered on the long axis of the conveyor 28 but on the inward flow of unloading silage which is offset forwardly from that axis. An improvement of this feature is described and claimed in my copending application SN-464,124 filed Apr. 25, 1974.

Having described my invention, I claim:

1. An improved silage discharge-hole-former for use in a silo on a horizontal rotary sweep of the spreading-/unloading type, which is mountable in the silo on vertically movable support means, including a ring gear, for raising and lowering movement therewith during silo filling and unloading operations and for sweep rotation relative thereto about the vertical axis of the ring gear, which has a horizontal sweep-frame and frame-mounted parts, including a drive shaft, a spreading/unloading horizontal sweep conveyor, and means motorizing both the shaft for rapid rotation and the conveyor for radial silage movement and which also has a sweep motor for moving said horizontal sweep-frame and conveyor in slow sweep fashion about said vertical axis, comprising:
   A. a rotatable vertically-depending auger;
   B. an open-ended close-fitting guide sleeve for concentrically encircling said auger; and
   C. means for mounting the sleeve and auger on a rotary sweep of said spreading/unloading type to depend from the sweep in concentric relation to each other and to said vertical axis,
      1. said mounting means being arranged
         a. for connecting the upper end of said sleeve to the sweep-frame for slow rotation therewith and
         b. for connecting the upper end of said depending auger to said drive shaft for rapid rotation about said vertical axis,
      2. said depending sleeve and auger being operative, when so connected, to provide a hole-forming unit
         a. which, during a filling operation wherein the rotary sweep rises as it spreads the incoming silage over and levels the top of the rising silage column, rises with the spreading sweep to function as a cylindrical barrier which prevents the incoming silage from lodging within the cylindrical space of such barrier so that said silage builds up a silage column around the barrier and thus forms an axially open-ended silage-discharge hole that rises upwardly entirely through the rising column from the bottom of that column and contemporaneously restricts the flow of incoming silage downwardly through that hole, and,
         b. which, during an unloading operation wherein the sweep lowers as it removes silage from the top of the silage column and directs it inwardly across the top toward the upper end of the discharge hole, descends with the unloading sweep to remain in the upper end portion of the discharge hole where it receives the removed silage and facilitates its movement downwardly through the unit toward the open bottom of said discharge hole.

2. The hole-former of claim 1 wherein:
A. the upper end of the auger projects beyond the upper end of the sleeve.

3. The hole-former of claim 1 wherein:
A. the lower end of the auger projects sufficiently beyond the lower end of the sleeve for hole-reaming purposes.

4. The hole-former of claim 1 wherein:
A. both ends of the auger project beyond the sleeve.

5. The hole-former of claim 1 wherein:
A. the upper end of the sleeve projects beyond the upper end of the auger.

6. The hole-former of claim 1 wherein:
A. the upper end of the sleeve has side inlet opening to receive unloading silage.

7. The hole-former of claim 6 wherein:
A. the upper end of the sleeve projects beyond the upper end of the auger.

8. The discharge-hole-former of claim 1 wherein:
A. The lower end of said descending auger is operatively positioned in relation to the lower end of the sleeve to ream said hole.

9. An improved hole-former for use in a feed storage tank or silo on a horizontal rotary sweep which has a vertical axis of rotation and a motorized drive shaft depending on the underside of the sweep for rotation relative to the sweep about the vertical axis thereof, comprising:
   A. a rotatable vertically-depending auger having a longitudinal center axis about which it may be rotated;
   B. means for mounting that auger
      1. not only for rising movement through a column of silage
      2. but also, as the top of said column is lowered by a silage unloading operation,
         a. for rotational movement in the top end portion of said hole, and
         b. for contemporaneous lowering movement;
   C. a vertical open-ended guide sleeve extending around said depending auger; and
   D. means for mounting said sleeve for vertical movement with said depending auger and with the upper end portion of said depending auger projecting upwardly out of said guide sleeve,
      1. said sleeve and auger cooperating to provide a cylindrical barrier which, during filling, forms a discharge hole and restricts the wobble of the auger within the sleeve and the leakage of silage downwardly through the sleeve and, which, during unloading, restricts the bridging of silage over the mouth of the sleeve and promotes the discharge of silage downwardly through the sleeve.

10. The hole-former of claim 9 wherein:
A. the lower end portion of said depending auger projects downwardly out of said guide sleeve for discharge-flow facilitating and hole-reaming purposes during lowering movement.

11. An improved silage discharge-hole-former for use in a silo on a horizontal rotary sweep of the spreading-/unloading type, which is mountable in the silo for raising and lowering movement during silo-filling and unloading operations and for sweep rotation relative thereto about a vertical axis, comprising:
A. an open-ended sleeve mountable to depend from the rotary sweep in concentric relation to said vertical axis and operative, when mounted,
   1. to rise with the silage-spreading sweep, during a silo-filling operation, to form an axially open-ended silage discharge hole that rises upwardly entirely through the rising column of silage from the bottom of that column, and 2. to descend with the silage-unloading sweep, during a silo-unloading operation, to receive the unloading silage and direct it downwardly toward the open bottom of said discharge hole; and B. means for restricting the flow of incoming silage downwardly through said discharge hole during the filling operation and for promoting the flow of outgoing silage during the unloading operation, 1. said means including an auger vertically arranged within the sleeve for contemporaneous rising and lowering movement therewith and for horizontal rotation relative thereto during the unloading operation, said auger rotation being in a direction promoting the downward flow of the unloading silage.

12. An apparatus for use in filling with silage and unloading silage from feed storage tanks or silos having a vertically movable support means centered upon a vertical center axis, comprising:

A. a horizontal rotary sweep of the spreading/unloading type, which is mountable in the silo on said support means for raising and lowering movement therewith during silo-filling and unloading operations and for sweep rotation relative thereto about said vertical axis;

B. an open-ended sleeve mounted to depend from the rotary sweep in concentric relation to said vertical axis and operative, when mounted, 1. to rise with the silage-spreading sweep, during a silo-filling operation, to form an axially open-ended silage discharge hole that rises upwardly from the bottom of a rising column of incoming silage to extend entirely through that column, and 2. to descend with the silage-unloading sweep, during a silo-unloading operation, to receive the outgoing silage unloaded from the top of said column and direct it downwardly toward the open bottom of said discharge hole; and C. means for restricting the flow of incoming silage downwardly through said discharge hole during the filling operation and for promoting the flow of outgoing silage during the unloading operation, 1. said means including an auger vertically arranged within the sleeve for contemporaneous rising and lowering movement therewith and for horizontal rotation relative thereto during the unloading operation, said auger rotation being in a direction promoting the downward flow of the unloading silage.

* * * * *